Jan. 19, 1937.                H. UFER                    2,068,622
                    METHOD OF MAKING DOUBLE CUT FILES
                       Filed July 5, 1935         2 Sheets-Sheet 1
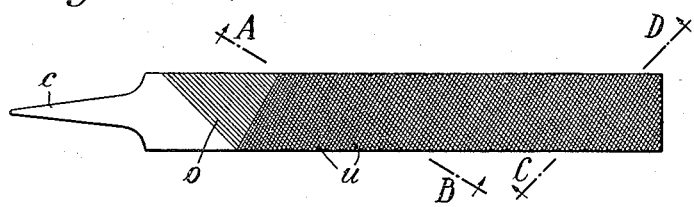
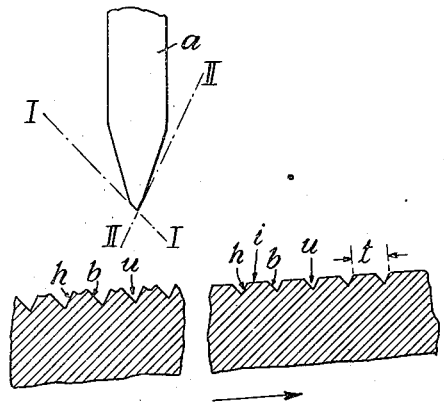
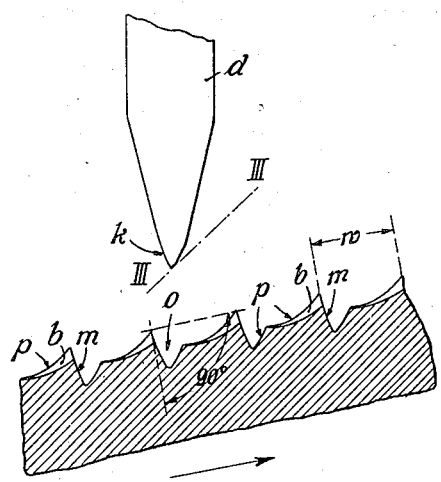
Witnesses:                                    Inventor:

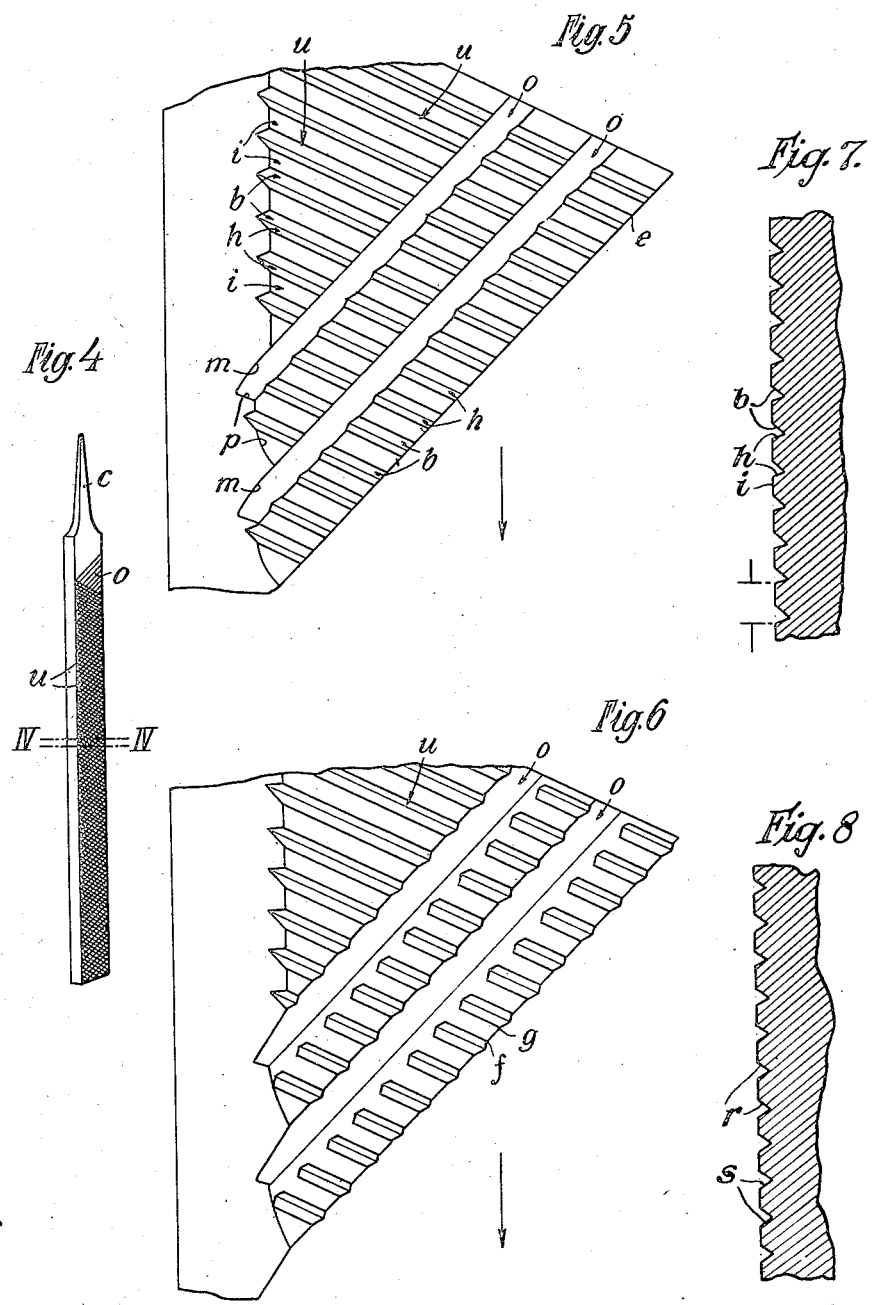

Patented Jan. 19, 1937

2,068,622

UNITED STATES PATENT OFFICE 2,068,622

METHOD OF MAKING DOUBLE CUT FILES

Hubert Üfer, Berlin, Germany

Application July 5, 1935, Serial No. 29,950
In Germany July 6, 1934

1 Claim. (Cl. 76—24)

Files cut with double cut are known in which the lower cut has teeth with raised tooth breast and the upper cut has teeth with receding tooth breast and in which the ratio of the cutting breast depths from the lower cut to the upper cut is 1:3 to 1:7. These known files present considerable advantages over ordinary files of similar material, especially as regards much higher efficiency. However, the production of such files with undercut or receding upper cut presents a great difficulty because considerable expense is incurred for repeated sharpening of the file-chisel and the interruption of the cutting machine for the exchanging of the chisel. By the penetrating of the chisel the material is driven upwards and has the tendency to warp in the direction towards the tang (that is to the pointed portion of the file to be inserted in the handle) as soon as the chisel if the wedge angle is small becomes slightly blunt after being in use a short time. The point of the tooth bends then slightly back so that the straight portion, the sharpness of which is material, does not form a sharp cutting edge on the tooth breast.

The invention relates to a method for producing a file, which method, whilst avoiding the drawbacks of the known file, ensures maximum efficiency and minimum cost of production.

After years of experimenting the applicant has discovered that this object can be attained if the breast of the lower cut extending in the cutting direction, whilst being of shallower depth and smaller pitch than the upper cut, is overcut as wide as possible and the warped uneven material in this machine cut file is completely removed for example by smoothing. The ratio of the depth of the lower cut to the depth of the upper cut should be at least 1:3 and the ratio of the pitch of the lower cut to that of the upper cut about 1:2. The overcutting of the preceding breast should therefore be carried out in such a manner that the breast portion is overcut farther than the downwardly sloping back portion; the angle which the tooth breast forms with the ground off adjacent surface of the file is therefore greater than the angle between the downwardly sloping portion of the tooth back and the surface of the file. Thus, narrow, absolutely level strips remain between the successive lower cuts.

Thereupon the upper cut is formed by the cutting in such a manner that the breast of the upper cut tooth is at right angles to the surface of the file and extends towards the base or deepest point of the tooth gap either first straight and then bulged or bulged along its entire length. A breast angle of 90° is sufficient to obtain a good cutting capability of the teeth and it allows the portion of the chisel which forms the corresponding tooth gap to be so shaped that it is as strong as possible and does not become blunt as quickly as in the case of chisels which produce the undercut cuts.

For increasing the strength of the chisel the bulge extending from the working edge serves which besides serves for the special purpose to prevent the formation of a sharp wedge angle on the base of the tooth gap and the jamming of chips.

The file made according to the invention presents the following advantages as compared with ordinary cut files of the same material:—

1. It can be used both as smooth file and as bastard file, and can therefore be described as a special file which replaces two files, namely a bastard file and a smooth file.
2. After being in use a short time it can be used as dead smooth file by exerting a slight working pressure.
3. Its efficiency as a smooth file is considerably greater than that of the ordinary smooth file.
4. Owing to the special construction of the gap in the upper cut tooth chips cannot jam on the bottom of the gap.

The file according to the invention is therefore far superior to ordinary files from an economical point of view.

An embodiment of the invention is illustrated by way of example in the accompanying drawings in which:—

Fig. 1 shows in top plan view a machine cut file according to the invention.

Fig. 2 is a section on line A—B of Fig. 1, showing the file after only the lower cut has been cut, the portion on the left showing the file before the grinding off and on the right after the grinding off of the burr, the chisel being shown in side elevation above the file.

Fig. 3 is a section on line C—D of Fig. 1 through the file after beside the smooth lower cut the upper cut has been cut, the chisel being shown in side elevation thereof.

Fig. 4 shows in perspective view a file produced according to the new method in such oblique adjusting which corresponds to the enlarged part drawings of the Figs. 5 and 6.

Fig. 5 shows on a considerably enlarged scale and in perspective view a portion of the file produced according to the new method corresponding approximately to the portion IV—IV of Fig. 4.

Fig. 6 shows a corresponding small portion of a file produced according to the method hitherto generally employed.

Fig. 7 shows the profile of the file illustrated in Fig. 5 perpendicularly to the direction of the lower cut.

Fig. 8 shows the profile of the file shown in Fig. 6.

Suppose the cuts are produced by means of a file cutting machine the table of which is inclined to the horizontal in the usual way. This position is shown in Figs. 2 and 3. On the table, which is moved against the chisel, the file blank is fixed in the direction of movement in such a manner that the point of the file blank is at the front and the tang at the rear. The arrows shown in the drawings indicate the direction in which the file blank is fed in the cutting machine and the working direction of the finished file when in use.

The lower cut $u$ is cut for example by the chisel $a$ illustrated in Fig. 2, which, as usual, has two faces I—I and II—II which, during the cutting operation, penetrate into the material of the blank. Thus, the lower cut teeth illustrated on the left of Fig. 2 are produced with the tooth breast $b$ and the tooth back $h$. The irregularities of the burr first present and consisting of thrown up points are visible. Hitherto it was customary when producing the lower cut on the file cutting machine not to smooth the lower cut owing to the uniformity of the teeth produced; the removal of the burr was hitherto left to the file press mounted in the machine. Contrary to this former method the burr produced when effecting the lower cut is ground off especially strongly as is shown on the right of Fig. 2. Thus, a lower cut $u$ is produced with absolutely level strips $i$ between the individual cuts (Fig. 2). The strongly projecting breast $b$ of the lower cut teeth and the strongly ground down lower cut tooth support the upper cut teeth, which are subdivided by the lower cut teeth, and thus effectively prevent the upper cut teeth from breaking out when filing.

The downward sloping back $h$ of the lower cut tooth is less overcut, that is projects less than the breast $b$. Contrary hereto the downwards sloping back $s$ of the lower cut tooth of the commonly used file (Fig. 6) is more over-cut than the corresponding tooth breast $r$. Moreover, the pitch $t$ of the under-cut is, according to the invention, smaller than the pitch $w$ of the upper-cut. The tang of the file is designated by $c$. The upper cut $o$ is cut with a chisel $d$ (Fig. 3) which on the side facing the tang $c$ has a face $k$ which either first extends straight and is then bulged or is bulged along its entire length. This bulge, which becomes more accentuated towards the working edge, is intended to produce a larger wedge angle which makes the chisel $d$ more resistant against wear. On the side remote from the tang $c$ a short face III—III is provided produced by smoothing and which is reground when the cutting edge of the chisel $d$ becomes blunt. This shape of the chisel prevents a sharp corner being formed at the bottom of the upper cut tooth which would facilitate the jamming of chips. If the file blank is in a corresponding inclined position in the file cutting machine, upper cut teeth are produced opposite the chisel, owing to the peculiar shape of the chisel, the breast $m$ of which teeth forms an angle of 90° with the surface of the file, as indicated in dot-dash lines in Fig. 3. The tooth back in the upper cut $o$ consists of a slightly inclined portion formed by warping of the material and a strongly sloping portion extending therefrom, both parts being designated by $p$. In the section shown in Fig. 3 a portion of the breast $b$ of the lower cut $u$ is shown in elevation.

The combination of the above mentioned measures effects that sharp and strong teeth without sharp wedge corners at their base are produced. In the example illustrated a smooth file is produced which can also be employed as a bastard file. The ratio between the depths of the lower and upper cuts is in Figs. 2 and 3 selected as 1:3, whereas in the files hitherto employed and illustrated in Fig. 6 it was about 1:2, which approximately corresponds to the ordinary files. Moreover, the upper cut tooth is shown projecting above itself in the usual manner in Fig. 6. On the other hand the pitch of the corresponding cuts is similar in the Figs. 5 and 6.

The illustrations show that the corners $e$ of the teeth produced by the under cut $u$ in the upper cut $o$ (Fig. 5) and compared with the ahead corners $f$ (Fig. 6) of the teeth of the ordinary file (compare herewith the lagging behind corners $g$ of this file) are considerably blunter and consequently more resistant against breaking out, which is further assisted by the fact that there are no projections produced by thrown up material.

I claim:—

A method for producing files cut with double cut and a depth ratio between the lower cut and upper cut of at least 1:3, consisting in overcutting as far as possible the breast for the lower cut in front of the upper end in the cutting direction, in preserving a shallower depth and smaller pitch for the lower cut as compared with the upper cut, in completely removing the thrown up uneven material by smoothing to form narrow flat strips between the successive cuts and in subsequently forming the upper cut so that the breast of the upper cut teeth is at right angles to the surface of the file and extends towards the bottom of the tooth gap first straight and then bulged or bulged over its entire length.

HUBERT UFER.